United States Patent
Nagao et al.

[11] Patent Number: 5,404,722
[45] Date of Patent: Apr. 11, 1995

[54] TORQUE GENERATOR WITH REDUCED BACKLASH

[75] Inventors: Makoto Nagao, Kameoka, Japan; Dwight B. Stephenson, Savage, Minn.

[73] Assignee: Eaton Corporation, Cleveland, Ohio

[21] Appl. No.: 181,689

[22] Filed: Jan. 14, 1994

[30] Foreign Application Priority Data

Jan. 29, 1993 [JP] Japan .................. 5-14076

[51] Int. Cl.[6] .................... F16D 31/02; F15B 9/10
[52] U.S. Cl. ...................... 60/384; 91/375 A; 180/132
[58] Field of Search ............ 60/384, 385; 91/375 R, 91/375 A; 180/132, 149

[56] References Cited

U.S. PATENT DOCUMENTS

| | | | |
|---|---|---|---|
| Re. 25,291 | 12/1962 | Charlson | 121/39 |
| 3,131,602 | 5/1964 | Ford | 91/137 |
| 4,169,515 | 10/1979 | Presley | 180/149 |
| 4,381,905 | 5/1983 | Petersen | 418/61 |
| 4,557,676 | 12/1985 | Petersen et al. | 60/384 X |
| 4,905,782 | 3/1990 | Rieger et al. | 91/375 A X |
| 4,936,094 | 6/1990 | Novacek | 60/384 |
| 5,070,956 | 12/1991 | Pawlak et al. | 180/132 |
| 5,072,586 | 12/1991 | Fassbender | 180/132 X |

FOREIGN PATENT DOCUMENTS 0209470 12/1982 Japan .................. 180/132

Primary Examiner—Edward K. Look
Assistant Examiner—Hoang Nguyen
Attorney, Agent, or Firm—L. J. Kasper

[57] ABSTRACT

A torque generator steering device (10) is disclosed of the type including a gerotor displacement mechanism (19) and valving (9), by the rotation of an input shaft (1) results in a hydrostatic power assist to an output shaft (2). In parallel with the power assist path, the input shaft (1) is connected by a torsion bar (15) to a connecting shaft (3) which, in turn, is connected to the output shaft (2). The connections between the torsion bar (15) and the connecting shaft (3), and between the connecting shaft (3) and the output shaft (2) are substantially zero backlash mechanical connections, thus providing a main torque transmitting path in parallel with the power assist path. Below a predetermined level of input torque, rotation of the input shaft (1) results in an immediate and corresponding rotation of the output shaft (2), thus providing a manual steering mode.

4 Claims, 4 Drawing Sheets

TORQUE GENERATOR WITH REDUCED BACKLASH

BACKGROUND OF THE INVENTION

This application claims priority, under 35 USC 119, of earlier-filed Japanese Application HEI 5-14076, filed Jan. 29, 1993.

The present invention relates to torque generator steering control units, and more particularly, to such devices in which a relatively low torque input is translated into a relatively high torque steering output, with the aid of a source of pressurized fluid.

Torque generators of the type to which the present invention relates have been in commercial use for many years, have been commercially successful, and are illustrated and described in greater detail in U.S. Pat. Nos. Re. 25,291 and 4,936,094, both of which are assigned to the assignee of the present invention and are incorporated herein by reference.

In the typical prior art torque generator of the type illustrated and described in above-incorporated U.S. Pat. No. 4,936,094, even a relatively low torque input is sufficient to deflect the leaf springs disposed between the spool (attached to the input shaft) and the sleeve, thus initiating the flow of fluid through the valving. In other words, at almost any level of input torque, the prior art torque generator operates as a fluid pressure assisted steering unit.

Furthermore, in the prior art torque generator, there are typically at least three sets of splines disposed in series between the input shaft and the output shaft, with each set of splines introducing a certain amount of looseness or backlash into the mechanical connection between the input shaft and the output shaft. In addition, the torque generator of U.S. Pat. No. 4,936,094 also includes a drive pin and bifurcated drive shaft arrangement, well known to those skilled in the art, which adds further to the backlash between the input and output shafts.

U.S. Pat. No. 4,169,515 discloses a steering unit which is an attempt by those skilled in the art to provide a steering unit having a hydraulic power assist which imparts its power assistance directly to the output shaft. However, the power assist device in the steering unit of the above-identified patent is a sliding vane device which either produces too little torque for a given package size, or conversely, results in too large a package size for the amount of torque produced. In other words, the device of the '515 patent does not amplify power to the same level, for a given package size, as an orbiting gerotor type "torque generator", as that term will be defined subsequently.

SUMMARY OF THE INVENTION

Accordingly, it is an object of the present invention to provide an improved torque generator steering unit which can operate in either a powered mode or in a manual mode, wherein the powered mode produces a relatively high torque steering output in response to a relatively low torque input, and wherein in the manual mode, rotation of the input shaft results in immediate and corresponding rotation of the output shaft.

The above and other objects of the invention are accomplished by the provision of an improved torque generator steering device adapted to receive a relatively low torque input and generate a relatively high torque steering output by means of a source of pressurized fluid. The steering device comprises housing means defining a fluid inlet port and an fluid outlet port. A fluid energy translating displacement means is associated with the housing means and includes a rotor member having relatively high torque rotary motion in response to the flow of pressurized fluid through the displacement means. A valve means is disposed in the housing means and has a neutral position and an operating position in which the valve means and the housing means cooperate to define a fluid path communicating pressurized fluid from the inlet port to the displacement means, and from the displacement means to the outlet port. An input shaft means is operable to transmit the relatively low torque input into movement of the valve means from the neutral position to the operating position. A follow-up means is operable to transmit the rotary motion of the rotor member into follow-up movement of the valve means from the operating position toward the neutral position. An output shaft means is operable to transmit the relatively high torque rotary motion of the rotor member into the relatively high torque steering output.

The improved torque generator steering device is characterized by connection means providing a direct, yieldable, substantially zero backlash mechanical connection from the input shaft means to the output shaft means, the connection comprising a main torque transmitting path. A drive means is operable to transmit the relatively high torque rotary output of the rotor member to the output shaft means. The fluid path and the drive means comprise a secondary torque transmitting path, in parallel with the main torque transmitting path.

DESCRIPTION OF THE PREFERRED EMBODIMENT

Figure 1:
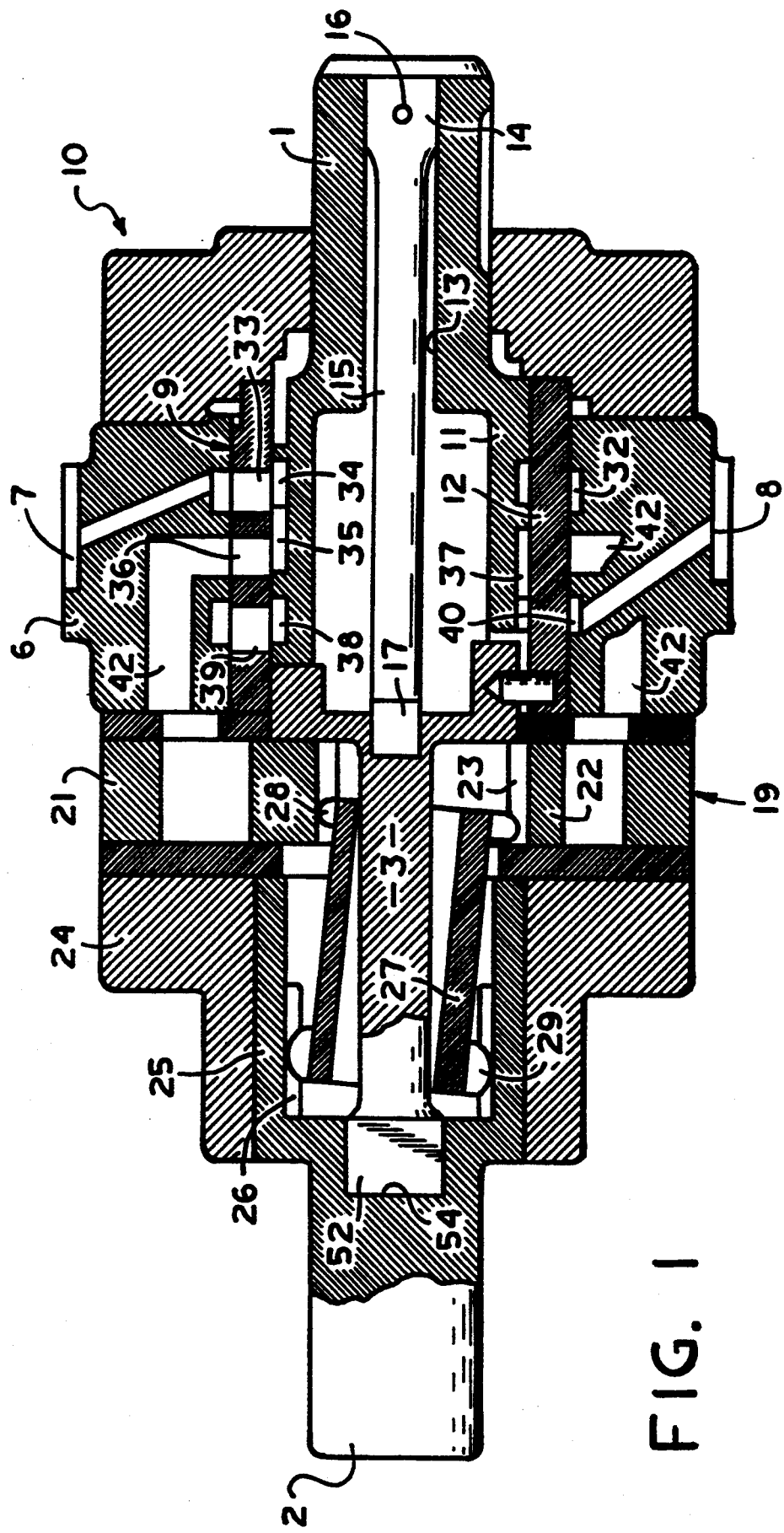
FIG. 1 is an axial cross-section of a torque generator steering control unit made in accordance with the present invention.
Figure 5:
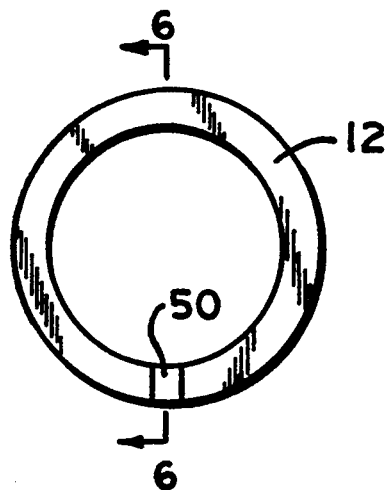
FIG. 5 is an end elevation of the sleeve valve of the present invention, taken from the left end in FIG. 1.
Figure 6:
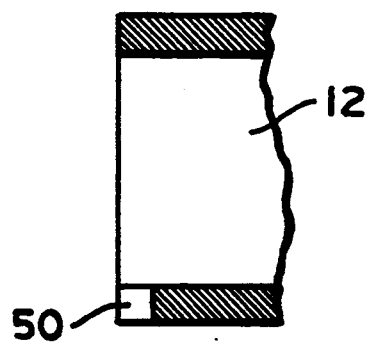
FIG. 6 is a fragmentary, axial cross section taken on line 6—6 of FIG. 5.
Figure 2:
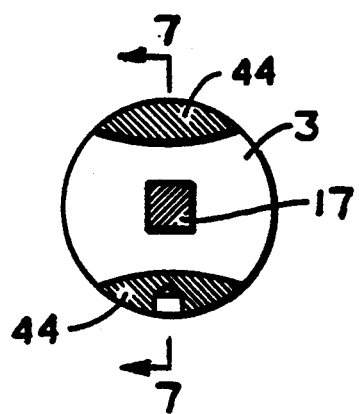
FIG. 2 is a plan view, taken from the right end in FIG. 1, of the junction of the torsion bar and connecting shaft of the present invention.
Figure 3:
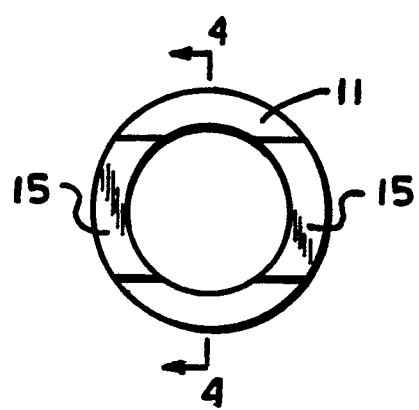
FIG. 3 is an end elevation of the spool valve of the present invention, taken from the left in FIG. 1.
Figure 4:
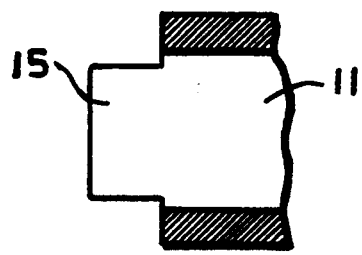
FIG. 4 is a fragmentary, axial cross-section taken on line 4—4 of FIG. 3.

Referring now to the drawings, which are not intended to limit the invention, FIG. I illustrates a hydrostatic torque generator steering control unit, typically referred to hereinafter simply as a "torque generator", generally designated 10. As will be understood by those skilled in the art, a "torque generator" is a steering control unit including a gerotor displacement mechanism or the functional equivalent thereof, whereby a relatively low torque steering input (e.g., rotation of a steering wheel) results in a relatively high torque steering output, without the device being unreasonably large.

The torque generator 10 includes an input shaft 1 which is connected to an output shaft 2 through the torque generator 10, by means of a connecting shaft 3 which will be described in greater detail subsequently. The input shaft 1 is typically connected to a vehicle steering wheel, while the output shaft 2 is typically connected to a power steering output device, neither the steering wheel nor the output device being shown herein.

Figure 7:
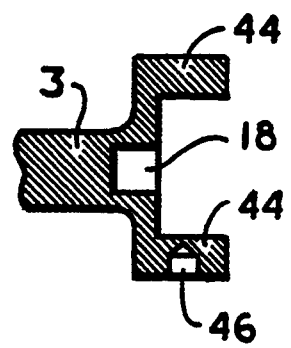
FIG. 7 is a fragmentary, axial cross-section taken on line 7—7 of FIG. 2, but with the torsion bar of the present invention removed.
Figure 8:
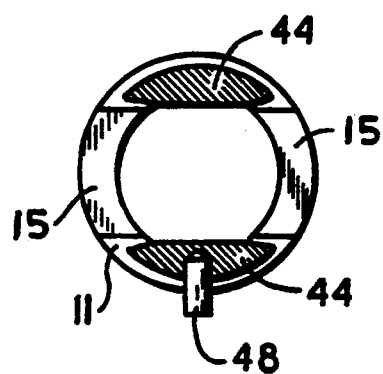
FIG. 8 is a transverse cross-section, similar to FIG. 2, illustrating the connecting means of the present invention in the neutral position.
Figure 9:
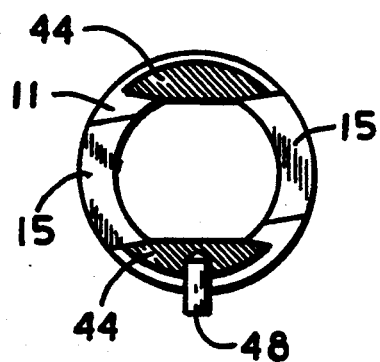
FIG. 9 is a transverse cross-section, similar to FIG. 8, illustrating the connecting means of the present invention in an operating position, rotated from the neutral position.

The torque generator 10 includes a housing 6 which defines a fluid inlet port 7 and a fluid outlet port 8. The housing 6 defines a central bore within which is rotatably disposed valving, generally designated 9. The valving 9 includes a rotatable spool 11 and a relatively rotatable sleeve 12, the spool being formed integrally at the inner end of the input shaft 1. The input shaft 1 defines an axially extending bore 13, and disposed therein is a forward end portion 14 of a torsion bar 15. The forward end portion 14 is non-rotatably fixed relative to the input shaft 1 by means of a pin 16. The rearward end of the torsion bar 15 terminates in a terminal portion 17 having, by way of example only, a generally square cross-section, for reasons which will be described subsequently. The terminal portion 17 is received within an opening 18 (see FIG. 7) defined by the connecting shaft 3, with the configuration of the opening 18 preferably being substantially identical to that of the terminal portion 17, to insure a relatively tight fit between the connecting shaft 3 and the torsion bar 15.

Disposed adjacent the housing 6 is an amplification unit 19 which, in the subject embodiment, comprises a gerotor gear set including an internally toothed member 21 and an externally toothed member 22, which defines a set of internal splines 23. The externally toothed member 22 (rotor member) is eccentrically disposed within the internally toothed member 21, with the teeth of the members 21 and 22 inter-engaging to define expanding and contracting volume chambers, in a manner which is now well known to those skilled in the art. As is also well known to those skilled in the art, the externally toothed member 22 orbits and rotates within the stationary, internally toothed member 21, thus comprising a form of gear reduction, and providing the high torque steering output in response to the low torque input.

Disposed to the left of the amplification unit 19 in FIG. 1 is a rearward housing portion 24 within which is journalled a generally cylindrical portion 25 of the output shaft 2. The portion 25 defines a set of internal splines 26, the motion of the set of splines 26 being purely rotational, as the output shaft 2 rotates.

The connecting shaft 3 is surrounded by a hollow, generally cylindrical, dogbone-type drive shaft 27 which defines a forward set of external splines 28 in engagement with the internal splines 23, and a rearward set of external splines 29 in engagement with the internal splines 26. As is well known to those skilled in the art, the function of the drive shaft 27 is to transmit orbital and rotational motion of the externally toothed member 22 into purely rotational motion of the output shaft 2.

NEUTRAL MODE

When the input shaft 1 is in a neutral position, with no torque being applied thereto, pressurized fluid enters the fluid inlet port from a source (not shown) of pressurized fluid, and enters into a first annular groove 32 defined by the housing 6. The pressurized fluid then flows into a second annular groove 34 defined by the spool 11 by means of radially extending bores 33 defined by the sleeve 12 and spaced circumferentially at regular intervals. This fluid then flows from the second annular groove 34 into a plurality of grooves 35 extending axially, and spaced at regular circumferential intervals. The pressurized fluid flows into a plurality of bores 36 defined by the sleeve 12, and then through a plurality of axially extending grooves 37. Pressurized fluid then flows into a third annular groove 38 defined by the spool 11 then flows into a fourth annular groove 40 defined by the housing 6, by means of radial bores 39, defined by the sleeve 12, and from the groove 40, fluid flows to the fluid outlet port 8. An axially extending bore 42, including a short radially extending portion, which is defined by the housing 6 extends toward the amplification unit 19 and is disposed to communicate with the bores 36. In this neutral condition, there is no flow of pressurized fluid from the fluid inlet port 7 to the amplification unit 19.

POWERED MODE

When the input shaft 1 is rotated clockwise, as viewed from the right end in FIG. 1, and the output shaft 2 is subjected to a substantial "load", the torsion bar 15 deflects to permit relative rotational displacement between the spool 11 and the sleeve 12. The reference to the output shaft 2 being under a substantial load refers, typically, to a situation wherein the operator is attempting to steer the vehicle while it is moving at relatively low vehicle speed, such as in a tight turn at a worksite.

When the pressurized fluid flows to the inlet port 7, it then flows through the first annular groove 32, through the bores 33 into the second annular groove 34. Pressurized fluid now flows through the grooves 35, then out through the bores 36 to the bores 42 communicating with the amplification unit 19 in a manner well-known to those skilled in the art. The pressurized fluid entering the amplification unit 19 flows into the expanding volume chambers of the unit 19, thus exerting a torque resulting in orbital and rotational movement of the externally toothed member 22.

Low pressure exhaust fluid then flows from the contracting volume chambers of the unit 19 through other of the bores 42, then flows through other of the bores 36 into the grooves 37 of the spool 11. The return fluid then flows into the third annular groove 38, then through the bores 39 into the annular groove 40 defined by the housing 6, and is then discharged through the outlet port 8.

As the orbital and rotational motion of the externally toothed member 22 is transmitted by means of the dogbone shaft 27 to the output shaft 2, such rotational motion is transmitted by means of the connecting shaft 3 back to the follow-up valve member (sleeve 12). As may best be seen in FIGS. 5 through 9, the connecting shaft 3 includes a pair of generally arcuate projections 44, one of which defines a radial bore 46. Disposed within the bore 46 is a pin 48 which extends radially into an opening 50 defined by the sleeve 12.

The forward end (output shaft end) of the connecting shaft 3 terminates in a square cross-section portion 52 which is disposed within a square cross-section opening 54, defined by the output shaft 2. As a result, rotation of the output shaft 2 is transmitted by the connecting shaft 3 into follow-up motion of the sleeve 12, in a manner well-known to those skilled in the art.

The fluid path through the amplification unit 19, as described above, operating in conjunction with the dogbone shaft 27 to transmit torque to the output shaft 2 comprises a "secondary" torque-transmitting path, with a "main" torque-transmitting path to be described subsequently, in connection with the description of the manual mode.

When the rotation of the input shaft 1 is counter-clockwise, the operation described is essentially the same, although the resulting directional rotation of the output shaft 2 is now also counter-clockwise, rather than being clockwise as is the case when the input shaft 1 rotates clockwise. Otherwise, the operation is substantially the same and detailed description thereof will be omitted.

MANUAL MODE

When the vehicle is being driven at relatively higher speeds (e.g., on-highway between worksites), substantially less torque is required in order to steer the vehicle. Under such operating conditions, the vehicle operator rotates the input shaft 1 and, because the torque required to steer the vehicle is less than that required to deflect the torsion bar 15, the rotation of the input shaft 1 is merely transmitted into a corresponding (substantially equal) amount of rotation of the connecting shaft 3. It is one important aspect of the present invention that the terminal portion 17 of the torsion bar 15 not have any substantial looseness or lost motion between it and the opening 18 of the connecting shaft 3. Similarly, the resulting rotation of the connecting shaft 3 is transmitted into a corresponding (substantially equal) amount of rotation of the output shaft 2. It is also an important aspect of the present invention that the terminal portion 52 of the connecting shaft 3 have no substantial amount of looseness or lost motion between it and the opening 54 defined by the output shaft 2.

Therefore, it is a further important aspect of the present invention that, at less than a pre-determined level of input torque, rotation of the input shaft 1 is merely transmitted into an equal amount of rotation of the output shaft 2, with no relative rotation between the spool 11 and sleeve 12, and therefore, no flow of fluid through the valving 9 or through the amplification unit 19. In other words, below a pre-determined level of input torque, the torque generator 10 of the present invention operates, not as a fluid pressure assisted steering control unit, but instead, operates purely as a manual input, mechanical steering unit.

A key element of the torque generator 10 of the present invention is the use of the torsion bar 15 which, together with the connecting shaft 3, provides a direct, but yieldable, connection between the input shaft 1 and the output shaft 2, thus permitting deflection of the valving 9 when the required steering torque is above a pre-determined level, and requires a power assist, but preventing deflection of the valving 9 when the required steering torque is below the pre-determined level. Furthermore, the various mechanical connections between the input shaft 1 and the output shaft 2 provide a direct, but substantially zero backlash, mechanical connection. In other words, when operating in the "manual" mode (i.e., below the pre-determined steering torque level) a certain amount of rotation of the input shaft 1 results in substantially immediate and corresponding (substantially equal) rotation of the output shaft 2, with no substantial amount of lost motion therebetween. This mechanical connection between the input shaft 1 and the output shaft 2 comprises a main torque-transmitting path.

As was mentioned in the background of the disclosure, a typical, prior art torque generator has at least three pairs of spline connections in series between the input and the output, resulting in a substantial amount of backlash, and perhaps one other mechanical connection in series therewith providing additional backlash. Therefore, the prior art torque generator would not be acceptable, operating in a manual mode, even if the typical leaf springs would be made substantially stiffer. By way of contrast, in the torque generator steering device of the present invention, there is the direct, yieldable, substantially zero backlash mechanical connection comprising the main torque-transmitting path, and the fluid pressure path comprising the secondary torque-transmitting path, in parallel with the main torque-transmitting path.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A torque generator steering device adapted to receive a relatively low-torque input and generate a relatively high-torque steering output by means of a source of pressurized fluid; said steering device comprising housing means defining a fluid inlet port in fluid communication with said fluid source, and a fluid outlet port; fluid energy-translating displacement means associated with said housing means, and including a rotor member having relatively high-torque rotary motion in response to the flow of said pressurized fluid through said displacement means; valve means disposed in said housing means and having a neutral position and an operating position in which said valve means and said housing means cooperate to define a fluid path communicating pressurized fluid from said inlet port to said displacement means, and from said displacement means to said outlet port; input shaft means operable to translate said relatively low-torque input into movement of said valve means from said neutral position to said operating position; follow-up means operable to transmit said rotary motion of said rotor member into follow-up movement of said valve means from said operating position toward said neutral position; output shaft means operable to transmit said relatively high-torque rotary motion of said rotor member into said relatively high-torque steering output, characterized by:

(a) connection means providing a direct, yieldable, substantially zero backlash mechanical connection from said input shaft means to said output shaft means, said connection comprising a main torque-transmitting path;

(b) drive means operable to transmit said relatively high-torque rotary motion of said rotor member to said output shaft means; and (c) said fluid path and said drive means comprising a secondary torque-transmitting path, in parallel with said main torque transmitting path.

2. A torque generator steering device as claimed in claim 1 characterized by said connection means comprising an intermediate shaft having a forward end portion in a lost motion connection with said valve means, and a rearward end portion in a direct, substantially zero backlash mechanical connection to said output shaft means.

3. A torque generator steering device claimed in claim 2 characterized by said connection means further comprising a torsion bar member providing a direct, yieldable mechanical connection from said input shaft means to said intermediate shaft to provide a steering output motion corresponding substantially to a steering input motion, below a predetermined input torque.

4. A torque generator steering device as claimed in claim 2 characterized by said output shaft means defining a first set of internal splines, said rotor member defining a second set of internal splines, and said drive means comprising a hollow, generally cylindrical shaft member surrounding at least a portion of said intermediate shaft and defining first and second sets of external splines, in engagement with said first and second sets of internal splines, respectively.

* * * * *